United States Patent
Sinclair et al.

(10) Patent No.: US 7,779,170 B2
(45) Date of Patent: Aug. 17, 2010

(54) STORAGE AREA NETWORK SYSTEM

(75) Inventors: David Adam Sinclair, Winchester (GB); Lee Jason Sanders, Havant (GB); Alistair Laesk Symon, Tucson, AZ (US); William James Scales, Fareham (GB); Barry Douglas Whyte, Eastleigh (GB); Carlos Francisco Fuente, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 11/773,065

(22) Filed: Jul. 3, 2007

(65) Prior Publication Data

US 2008/0126615 A1 May 29, 2008

(30) Foreign Application Priority Data

Jul. 4, 2006 (GB) ................................. 0613239.3

(51) Int. Cl.
*G06F 3/00* (2006.01)
(52) U.S. Cl. .................. 710/15; 710/19; 710/38; 710/74; 714/1; 714/2; 714/5; 714/7; 714/9
(58) Field of Classification Search ........... None
See application file for complete search history.

(56) References Cited

U.S. PATENT DOCUMENTS

| | | | |
|---|---|---|---|
| 6,425,049 B1 * | 7/2002 | Yamamoto et al. | 711/112 |
| 7,085,883 B1 * | 8/2006 | Dalgic et al. | 711/114 |
| 7,353,306 B2 * | 4/2008 | Thorpe et al. | 710/74 |
| 2002/0026603 A1 * | 2/2002 | LeCrone et al. | 714/6 |
| 2003/0126315 A1 * | 7/2003 | Tan et al. | 710/1 |
| 2003/0233502 A1 * | 12/2003 | Murotani et al. | 710/74 |
| 2004/0268037 A1 * | 12/2004 | Buchanan et al. | 711/114 |

OTHER PUBLICATIONS

Office action in counterpart Chinese patent application No. 2007101269208, dated Aug. 7, 2009 (No English Translation Provided), in which US Pat. No. 6,425,049 (referenced above) is cited.

* cited by examiner

*Primary Examiner*—Eron J Sorrell
(74) *Attorney, Agent, or Firm*—Jennifer Anda

(57) ABSTRACT

A storage network includes a path processor for directing data onto one of two or more paths between an application host and two or more storage controllers in a storage subsystem. To determine a data path within the storage network, the operational status of a storage controller in the storage subsystem is monitored. It is determined whether a change in the operational status of the storage controller is a failure or a potential failure. This determination is sent to the path processor. The path processor redirects application host data from the path controller on the basis of the determination.

30 Claims, 3 Drawing Sheets

STORAGE AREA NETWORK SYSTEM

RELATED APPLICATIONS

The present patent application claims priority to the previously filed United Kingdom patent application entitled "storage area network system," filed on Jul. 4, 2006, and assigned serial no. 0613239.3.

FIELD OF THE INVENTION

The present invention relates generally to a storage area network (SAN) system, and more particularly to the use of alternative paths from a server to a storage subsystem in a SAN system.

BACKGROUND OF THE INVENTION

The primary function of a storage subsystem is to provide storage to an application running on a server. In the simplest arrangement the server has only one means of accessing the storage, and the storage device contains no redundancy. This is generally not a very satisfactory solution, as if the access method fails, or a part of the storage device fails, the server can no longer access the stored data.

A better solution achieves higher availability by using a SAN based storage subsystem in which the storage device is part of a storage subsystem that presents data from the storage device at a number of ports on the SAN. This is generally achieved by having multiple controllers within the subsystem and arranging that each controller can present the data from the storage device to the SAN.

In another improvement, the application host uses a multi-path processor to manage different paths to the same storage device. Multiple paths use multiple ports in the server to access a single or multiple storage controllers. However, it is possible to have multiple paths when there is (a) one port in the server and more than one in the storage controller(s) or (b) more than one port in the server and one port in the controller.

A typical SAN system 10 includes a server 12 and a storage subsystem 13 is shown in FIG. 1. The server 12 includes an application host 22 and multi-path processor 24 accessing a storage logical unit (LUN) 18 provided by the storage subsystem 13 with two controllers 14A and 14B.

The application host 22 may access the LUN 18 via a combination of paths 20A, 20B, 20C and 20D. A multi-path processor 24 in the host 22 chooses to use one or more of these paths via one of two ports 26A and 26B. If a path fails, or a controller in the storage subsystem fails, then the multi-path processor can use an alternative path. When the path or controller is restored, the multi-path processor can consider reusing this restored path or controller. The multi-path processor generally polls the missing path or controller to establish if and when it has become available again. If there are many paths between the host and storage subsystem, and there are many LUNs being presented to the host, it can take a considerable time to poll all the potentially available paths to see if any 'lost' paths have come back.

A controller reset can arise in two different circumstances: a controller failure and an intentional controller reset. From the multi-path processor's point of view there is no reasonable way of predicting that an internal controller failure will occur before it actually happens. If on the other hand the controller is being reset prior to a firmware upgrade or other maintenance action, then the multi-path processor will only know a reset will occur if the reset originates from the server. Therefore, without up-to-date knowledge of the controller status the multi-path processor will not efficiently choose the best paths for sending data to the LUN.

Conversely, there are a number of problems in restoring full redundant use of these controllers after a controller is reset. For instance, it may take some time for the multi-path processor to realize that a path has been restored to a storage controller that has recently been reset. Even when a path has been restored, the multi-path processor may not be able to use it because the controller is not yet ready to accept data (e.g., it may not have resynchronized its cache with its partner). For these and other reasons, there is a need for the present invention.

SUMMARY OF THE INVENTION

The present invention relates to a storage area network system. A method of one embodiment of the invention is for determining a data path in a storage network. The network has a path processor for directing data onto one of two or more paths between an application host and two or more storage controllers in a storage subsystem. The method monitors the operational status of a storage controller in the storage subsystem, and determines whether a change in the operational status of the storage controller is a failure or a potential failure. This determination is sent to the path processor. The path processor redirects application host data from the path controller on the basis of the determination.

A storage area network system of an embodiment of the invention includes a storage subsystem having two or more storage controllers and at least one controller monitor. The system further includes a storage area network having two or more paths between an application host and the two or more storage controllers in a storage subsystem. The system also includes a path processor for directing application host data onto one of the paths through the network to one of the storage controllers. The at least one controller monitor monitors the two or more storage controllers in the storage subsystem and sends an operational status message to the path processor when it determines the operational status of a storage controller has changed. On receipt of the operational status message, the path processor redirects application host data through the network to or from the storage controller.

A computer-readable medium of an embodiment of the invention has one or more computer programs stored thereon to perform a method for determining a data path in storage network. The network has a path processor for directing data onto one of two or more paths between an application host and two or more storage controllers in a storage subsystem. The method monitors the operational status of a storage controller in the storage subsystem, and determines whether a change in the operational status of the storage controller is a failure or a potential failure. The method sends this determination to the path processor. The path processor redirects application host data from the path controller on the basis of the determination.

A storage subsystem of an embodiment of the invention is connected via a storage area network system to a server. The subsystem includes two or more storage controllers and a controller monitor. The monitor monitors the operational status of a storage controller in the storage subsystem, determines whether a change in the operational status of the storage controller is a failure, a potential failure, a reconnection or a load change, and sends the determination to the server. The server redirects data from or to the storage controller in the storage subsystem on the basis that determination.

A storage area network system of another embodiment of the invention includes a storage subsystem having two or more storage controllers, a storage area network having two or more paths between an application host and the two or more storage controllers in a storage subsystem, and a path processor for directing application host data onto one of the paths through the network to one of the storage controllers. The system further includes means for monitoring the two or more storage controllers in the storage subsystem and for sending an operational status message to the path processor when determining the operational status of a storage controller has changed. The means may be implemented as one or more controller monitors. On receipt of the operational status message the path processor redirects application host data through the network to or from the storage controller.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

According to a first aspect of the present invention, there is provided a method of determining a data path in storage network. The network has a path processor for directing data onto one of two or more paths between an application host and two or more storage controllers in a storage subsystem. The method monitors the operational status of a storage controller in the storage subsystem, and determines whether a change in the operational status of the storage controller is a failure or a potential failure. The method sends the determination to the path processor, where the path processor redirects application host data from the path controller on the basis of that determination.

According to a second aspect of the invention there is provided a storage area network system including a storage subsystem having two or more storage controllers and at least one controller monitor. The system also includes a storage area network including two or more paths between an application host and the two or more storage controllers in a storage subsystem. The method further includes a path processor for directing application host data onto one of the paths through the network to one of the storage controllers. The controller monitor monitors the two or more storage controllers in the storage subsystem and sends an operational status message to the path processor when it determines the operational status of a storage controller has changed. On receipt of the operational status message the path processor redirects application host data through the network to another path controller.

In one embodiment, the controller monitor determines whether the change in status is a failure, potential failure, or reconnection, and sends this determination in the operational status message. In this case the multi-path processor does not check the detail of the status of the storage controller and simply redirects the application host data toward or away from the two respective storage controllers.

In one embodiment, the controller monitor sends an operational status message whenever the operational status changes. In this case the path processor determines whether the change in status is a failure or potential failure and then acts accordingly.

Description of the Drawings

Figure 1:
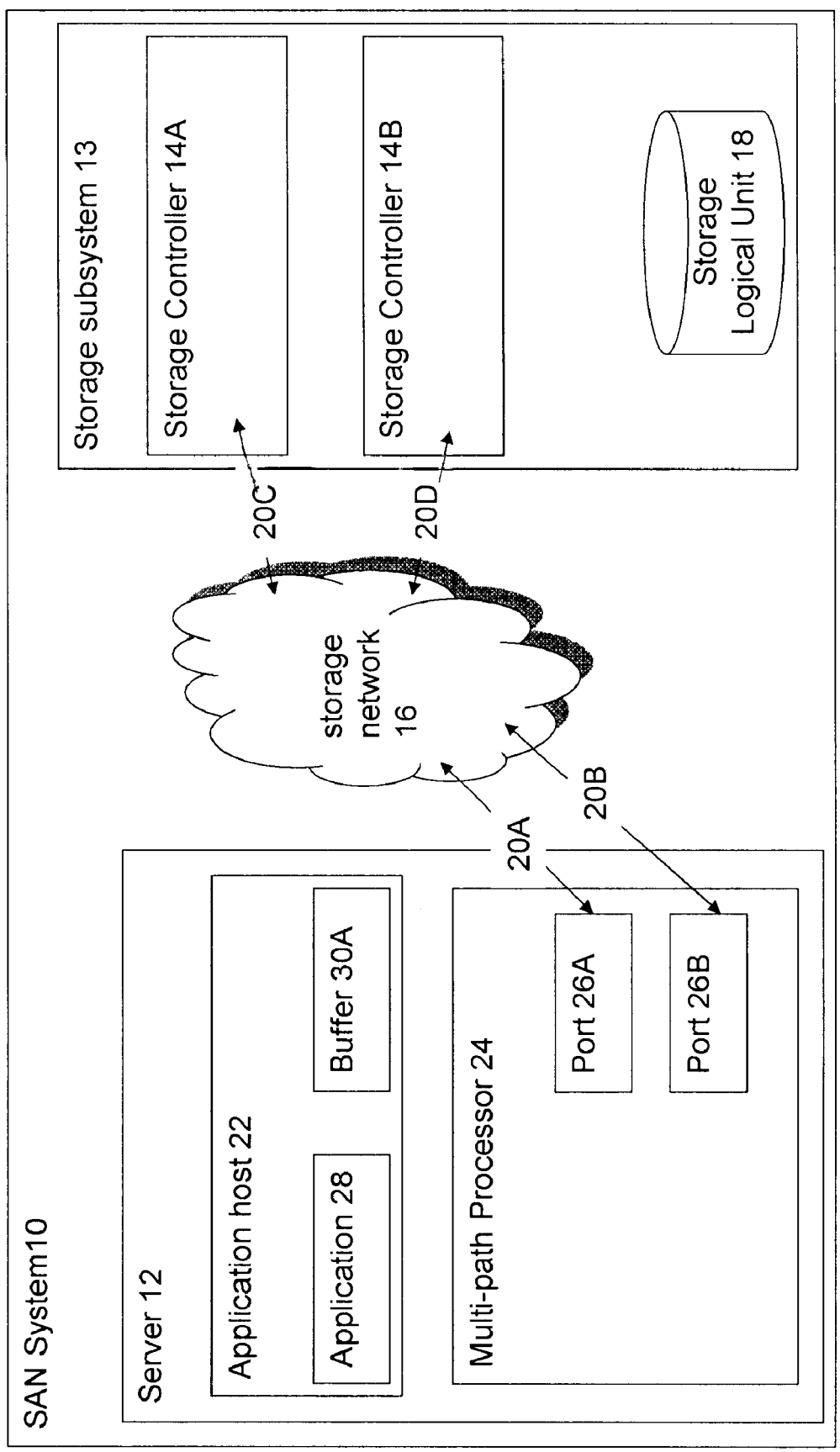
FIG. 1 is a schematic of a typical storage area network system, according to the prior art.
Figure 2:
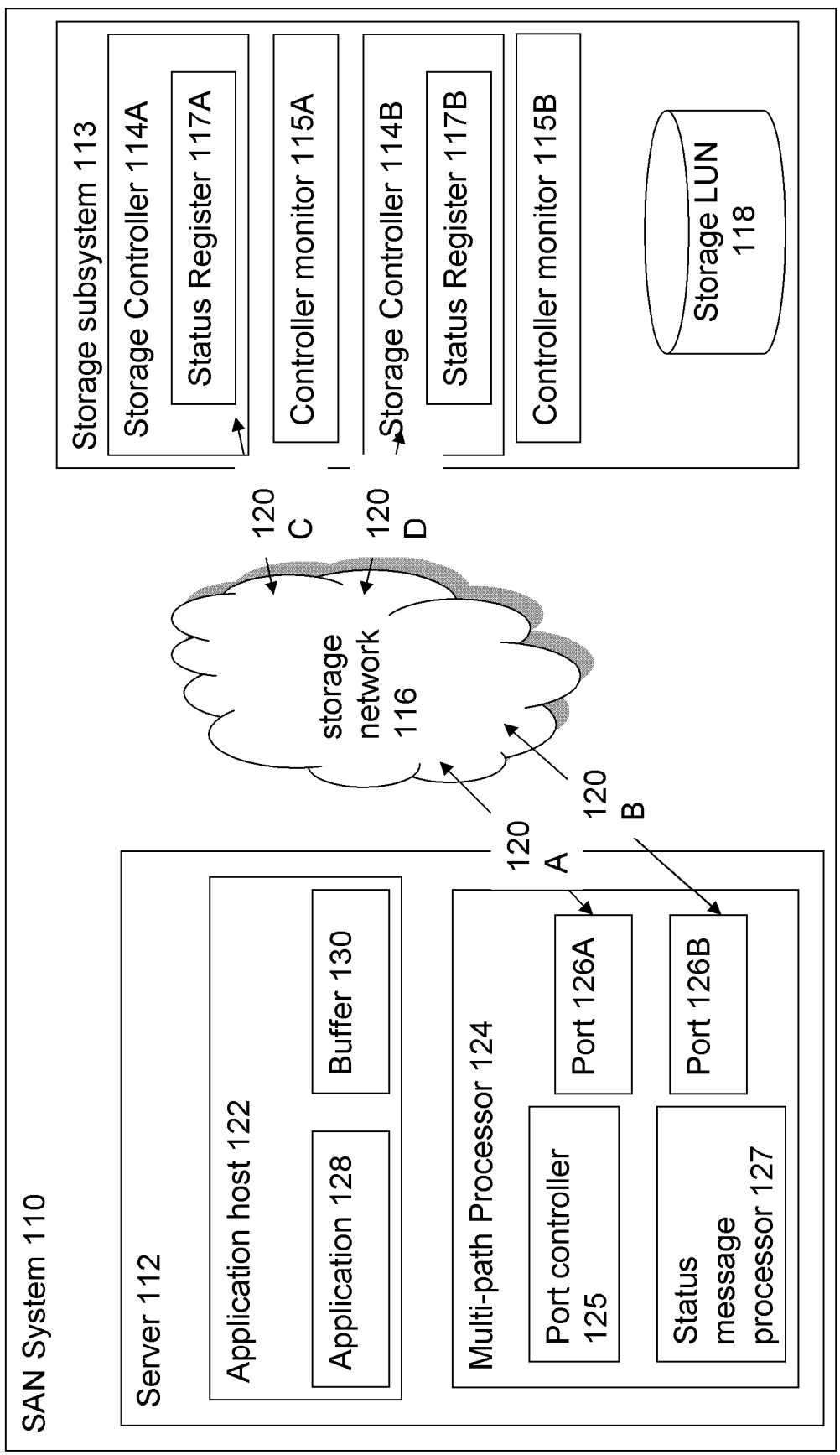
FIG. 2 is a schematic of a system, according to an embodiment of the invention.

FIG. 2 shows a storage area network (SAN) system 110, according to an embodiment of the invention. The SAN 110 includes a server 112 linked by multiple path storage area network (SAN) 116 to a storage subsystem 113. The storage subsystem 113 includes storage controllers 114A and 114B, controller monitors 115A and 115B, and storage logical unit (LUN) 118.

The SAN 110 links the storage subsystem 113 to the server 112 along one of a plurality of paths 120A, 120B 120C and 120D in SAN 116. Any one of the paths can be used by the server to read or write data from the storage subsystem 113. The SAN paths have a network of switches in which some switches are faster than others and therefore the time taken through the network on different paths will be different. Also one switch might be busier than others or more heavily used or more reliable or unreliable. The links might also be longer or shorter.

The server 112 includes an application host 122 and a multi-path processor 124. The application host 122 includes an application 128 and an application buffer 130. The application host 122 selects any one of the paths when it needs to do an I/O transaction with the storage controller. The application 128 is a set of instructions for achieving a business purpose such as a transaction retrieval database. One or more of these instructions will be a read or write instruction executed by the application host. The application buffer 130 stores data that is received from or is to be transmitted to the storage subsystem 113. The application host 122 executes the application 128 and uses the application buffer 130 in response to a read or write operation.

The multi-path processor 124 includes a port controller 125, device ports 126A and 126B, and status message processor 127. Each device port 126A and 126B can make an I/O request to the storage controllers over path 120A, 120B, 120C and 120D. The status message processor 127 receives status messages from the storage subsystem indicating a status condition of: failure, potential failure, reconnection, or overload. In one embodiment, these messages are passed to the port processor 125 to make the choice of which port and path to use depending on the status type. In another embodiment, the status message processor receives raw status data from the storage controllers, and the status message processor determines the status condition (failure, potential failure, connection or overload) and transmits this status message to the port controller 125.

The port controller 125 receives read data instructions from the application host 122 as instructed by the application 128 as well as a status message containing the status condition. Using the instructions and status condition the port controller selects a primary path and a storage controller, links the primary path to the buffer 130 and requests data from storage controller using the primary data path. If a received status condition is fail for a particular storage controller then the port controller will not select this storage controller again until a 'reconnected' status condition is received. Also any data transfer tasks that can be redirected are redirected.

If a received status condition is a potential fail for a particular storage controller then the port controller will not select this storage controller for high reliability transfers. However, it will still use the storage controller for normal transfers until a 'reconnected' status condition is received. If a received status condition is overload for a particular storage controller then the port controller will redirect data transfers using this storage controller. A more generic status condition is 'load' with a parameter to indicate the loading percentage; this 'load' condition will allow the port controller to perform load balancing.

The storage subsystem 113 components—storage controllers 114A and 114B, controller monitors 115A and 115B, and storage logic unit (LUN) 118—are now described. The storage logical unit 118 is a single physical device for storage typically a hard drive. The LUN 118 could be a collection of physical drives acting as a single logical unit, such as a RAID array. The storage controllers 114A and 114B have direct access to the storage LUN 118.

The storage controllers 114A and 114B can receive multiple read requests arriving via different paths 120A, 120B, 120C and 120D. A first read request will cause the appropriate data to be loaded into the cache (not shown) in the storage controller 114A and subsequent reads are then satisfied from this cache and will not have significant impact on performance. The storage controllers collect and store raw data about their operating condition and store it in a status register 117A and 117B. This raw data includes: failure status of internal redundant components; the number of internal retry operations that have been required; the nature of internal retry operation that has been performed; the number of any internal resets that have been performed; the age of the unit and the amount of time it has been powered on; reset status; throughput; temperature; and storage firmware level.

Figure 3:
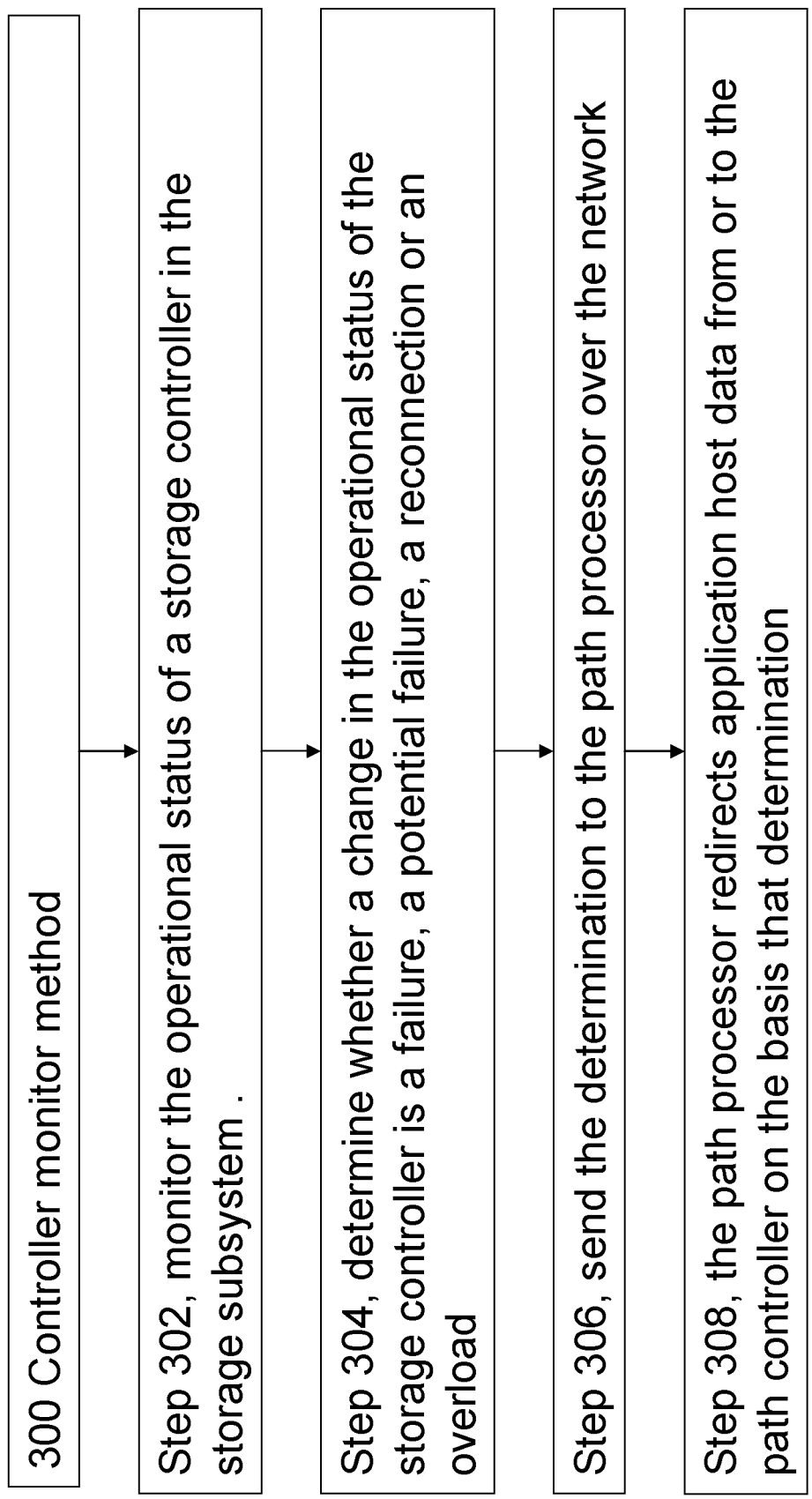
FIG. 3 is a flowchart of a method, according to an embodiment of the invention.

FIG. 3 shows a method 300, according to an embodiment of the invention. The controller monitors 115A and 115B perform the method 300 in one embodiment. The controller monitor monitors (part 302) the operational status of a storage controller in the storage subsystem, it does this by directly reading the status register 117A or 117B in the storage controllers. Using the status information it determines (part 304) the condition of the storage controller and specifically whether the status condition falls into one of the following types: a failure, a potential failure, a reconnection, or an overload. Overload is determined by comparing the current load with standard optimal load levels or comparing the current load on this controller with current loads on other controllers. The controller monitor would then need to 'see' both controllers to make this determination. Once this determination is made it is sent to the multi-path processor for use in redirecting data from or to the path controller.

In another embodiment, two storage controllers are paired together with their respective controller monitors so that each controller monitor monitors its own storage controller and the paired storage controller. If a controller monitor cannot monitor and send out a failed status condition then its paired controller monitor does so. Partner storage controllers can do this by using, for example, a heartbeat message between the controllers with a relatively short timeout, such as one-to-five seconds. Thus a remaining partner controller can tell the using hosts systems that its partner has been reset within a few seconds of that event occurring. In another embodiment, a single controller monitor monitors two or more storage controllers. This provides the benefits of the invention but is not as reliable as having a pair of controller monitors.

The status message can be communicated using the SCSI SPC-3 messaging for Asymmetric Logical Unit Access. This provides for identification of Active/Optimized, and Active/Non-Optimized paths. It also provides for the identification of paths to be changed, such as to allow Active/Optimized to become Active/Non-Optimized and vice-versa. This identification can be used to indicate to host multi-pathing drivers that the paths a host should use have been changed. The standard also provides for asynchronous notification that a path has changed via the SCSI Unit Attention mechanism, which can operate like the messaging described in the disclosure. But it should be noted that in some Operating System environments this information is not communicated to the multi-pathing driver. In these environments the information can be communicated using a polling technique.

In another embodiment, the multi-path processor provides feedback to indicate recognition of the change in preferred path, and that it is ready and able to use the new path. This enhancement can be used without further change in host drivers where the host drivers recognize and respond to the SCSI standard SPC-3 information. For each using host system, the redundant controller tracks each controller port that has received I/O from said host system over a recent short period of time A, such as five seconds. The redundant controller considers a host to have acknowledged the change in path once the host has not sent any I/O to a non-preferred port in the last period A of time. A host will either: start sending I/O to the new preferred paths, and will no longer be sending I/O to the non-preferred paths, and the time period A will expire; stop sending I/O altogether (perhaps because application activity has quiesced), and the time period A will expire; continue to send I/O to the non-preferred paths, disregarding the new designation for the paths, and the time period A will not expire. The controller has to continue to wait for up to a longer period of time B, such as one minute, until there are no hosts with an unexpired time period A—in other words, until all hosts can be considered to have acknowledged the preferred path. If after time period B, a host persists in continuing to send I/O, two options arise, as described below.

First, a situation may be indicated where the host is unable to satisfy the requested path change perhaps because of a fault in the system connectivity, and for certain planned outages, such as concurrent code load, the planned outage might be aborted to give opportunity to allow the fault to be repaired, and hence avoid the loss of connectivity. Alternatively, the system requirements might be such that the planned outage must continue after period B has expired. This provides an alternative to the message from host to controller that the paths are about to changed. An explicit message offers a useful alternative implementation, and such a message might be embodied for instance in SCSI messaging by using an explicit 'dummy' Set Target Port State command.

The above-described embodiment may also be improved. For instance, before beginning a coordinated switch of all hosts, it is useful to ensure that all hosts are able to send I/O to the intended new preferred paths. This need arises in particular during concurrent code load where multiple switches of preferred path are needed. By waiting until all hosts are ready to begin the switch, it is possible to minimize periods of time where I/O is being sent to the non-preferred path, and hence minimize the performance impact. What is needed is a means to identify when a host has recognized a newly available path, as for example, is established following a controller reset operation during a concurrent code load process. This can be achieved by monitoring when hosts have received and processed the unit attention conditions that are set on those new paths. The optimum point in time for beginning a new change in preferred path sequence, starting by designating different paths as Active/Optimized and Active/Non-Optimized, can be established by waiting until all host ports that have sent SCSI Tasks in the last period C, such as two minutes, to have no Unit Attentions associated with the establishment of new paths outstanding on any controller Target port.

A first example of one embodiment of the invention is now described. If the controller is about to perform a planned reset it should send a message to the host system indicating that this controller is about to reset and that transfers to or from this controller should be failed over to the other controller in a controlled manner. Transfers that are in progress to the controller that is to be reset are completed as normal. In a particular embodiment, when the host system has ceased using paths to the controller that is about to be reset, the host could also send a confirmatory message to the controller.

In another embodiment, the message sent by the controller to the host systems can contain a timeout value. This timeout is desirably started by each host, and if the host does not see that the controller was in fact reset within this timeout, then the host should probe all the controllers to determine if they are available. This timeout mechanism can deal with the situation where a controller thinks it is about to be reset but the controller reset is not actually executed for some reason. In another embodiment, during this timeout period the controller and its partner controller can flush their write caches so that any new writes received by either controller are not cached but are dealt with as write-through operations. This preemptive flush of the write cache is performed by both controllers in parallel, which is a performance benefit over the situation where a controller is allowed to reset and then the other controller subsequently flushes its cache (since in this case only one controller is doing the flush). This preemptive flush also preserves the write cache redundancy, so in the event of a loss of a single controller during the flush, there is no loss of data. This is an improvement in data protection over the original scheme where the first controller is allowed to reset and the remaining controller flushes its write cache, as data will be lost if the second controller fails during this period.

When the controller receives the confirmatory message mentioned in the first example above from all the hosts that are currently using the controller, and when the controller and its partner have completed flushing their caches, the controller reset can be executed. If for some reason, the reset is cancelled prior to it being executed, the controller sends a message to all the using host systems indicating that the reset is cancelled and this message tells the using hosts systems to resume using paths to this controller. If the reset is executed and has been completed, the controller sends a message to the using host systems to indicate that is now ready to resume transfer. This causes the using host systems to cancel their timeouts and to reopen and use paths to this controller. Both controllers resume using their fast write caches.

In a second example of one embodiment, if the controller performs an unplanned reset, the controller monitor or the partner controller monitor sends a status message to the multi-path processor indicating that a storage controller has been reset. This message causes the using host systems to abort a transfer that is outstanding on paths to the controller that has been reset and to reissue that transfer to the remaining controller.

In an alternative embodiment, while the controller reset is in progress and possibly afterwards, its partner controller must flush its write cache; any new writes received by this controller will not be cached but will be dealt with as write-through operations. This assumes a controller that has a volatile write cache; it would not be necessary to flush the write cache if it was non-volatile. When the controller that was reset comes back, the pair of controllers have to resynchronize their write caches. This can be achieved by either letting the controller that was not reset completely flush its cache or by copying the partially flushed contents of that cache to the cache in the controller that was reset. In any case, when the controller that was reset comes back, it can send a message to the using hosts indicating that is now present and the using hosts immediately resume sending I/O via paths to that controller.

In a third example of one embodiment, a pair of dual active controller monitors can determine that they are not using their resources effectively. One controller monitor can give advice via a status message to the status message processor to rebalance the transfer load from the hosts. If controller 114A has a shortage of resources a message is sent to the status message processor to direct more transfers to the other storage controller 114B.

In a fourth example of one embodiment, if a logical unit is mapped to a host and the host has already configured devices for this logical unit, and the logical unit is then deleted, when the host configuration methods are run again, they may take a very long time to complete. This is because the host is waiting for each command to timeout to the now-deleted logical unit. If the storage controller sent a message to the host at the time that the logical unit is deleted the host could then make a note that the device no longer exists and would not have to time out each command when the configuration methods are run. Instead it could just mark the device as offline or whatever is appropriate in that particular host OS for a non existent device.

It will be clear to one skilled in the art that the method of the present invention may suitably be embodied in a logic apparatus having logic means to perform the steps of the method, and that such logic means may include hardware components or firmware components. It will also be appreciated that the method described above may also suitably be carried out fully or partially in software running on one or more processors (not shown), and that the software may be provided as a computer program element carried on any suitable data carrier (also not shown) such as a magnetic or optical computer disc. For example, such a computer program or programs may be stored on a computer-readable medium, such as a tangible computer-readable medium like a recordable data storage medium. The channels for the transmission of data likewise may include storage media of all descriptions as well as signal carrying media, such as wired or wireless signal media. The terminology "computer-readable medium" as used herein is inclusive of such signal carrying media, as well as storage media.

It will be equally clear to one skilled in the art that the logic arrangement of the present invention may suitably be embodied in a logic apparatus having logic means to perform the steps of the method, and that such logic means may include components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

The present invention may suitably be embodied as a computer program product for use with a computer system. Such an implementation may include a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

It will be further appreciated that embodiments of the present invention may be provided in the form of a service deployed on behalf of a customer to offer service on demand. It is thus noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

What is claimed is:

1. A method for determining a data path in a storage network, the network having a path processor for directing data onto one of two or more paths between an application host and two or more storage controllers in a storage subsystem, the method comprising:
   monitoring the operational status of a storage controller in the storage subsystem, by a first controller monitor;
   determining whether a change in the operational status of the storage controller is a failure or a potential failure; and,
   sending the determination to the path processor,
   wherein the path processor redirects application host data from a path controller on the basis of the determination,
   wherein the storage controller is a first storage controller of the two or more storage controllers, and the two or more storage controllers further comprise a second storage controller,
   wherein the method further comprises:
      monitoring the operational status of the first storage controller by the second controller monitor directly reading the first storage controller;
      monitoring the operational status of the second storage controller by the first controller monitor directly reading the second storage controller;
      monitoring the operational status of the second storage controller by the second controller monitor directly reading the second storage controller,
   wherein if the first controller monitor does not send an operational status message regarding the first storage controller, then the second controller monitor sends the operational status message regarding the first storage controller.

2. The method of claim 1, wherein determining whether the change in the operational status of the storage controller is a failure or a potential failure further determines whether a change in the operational status of the storage controller is a reconnection.

3. The method of claim 1, wherein determining whether the change in the operational status of the storage controller is a failure or a potential failure further determines whether a change in the operational status of the storage controller is an overloading of the storage controller.

4. The method of claim 1, wherein monitoring the operational status of the storage controller monitors the operational status of two storage controllers in the storage subsystem.

5. The method of claim 1, further comprising maintaining operational status information, wherein monitoring the operational status of the storage controller monitors the operational status information for changes.

6. The method of claim 1, wherein the operational status indicates an immediate failure of a storage controller and after receipt of the operational status message the path processor immediately redirects application host data onto another path controller unaffected by the failed storage controller.

7. The method of claim 1, wherein the operational status indicates a potential failure of a storage controller and after receipt of the operational status message the path controller prepares to redirect application host data onto another path controller unaffected by the failed storage controller.

8. The method of claim 1, wherein the operational status indicates a reconnection of a storage controller and after receipt of the operational status message the path controller redirects application host data back to the reconnected path controller.

9. The method of claim 1, wherein the operational status indicates an overload status of a storage controller and after receipt of the operational status message the path controller redirects some of the application host data onto another path controller unaffected by overload.

10. A storage area network system comprising:
   a storage subsystem comprising a plurality of storage controllers and at least one controller monitor;
   a storage area network comprising a plurality of paths between an application host and the plurality of storage controllers in the storage subsystem; and,
   a path processor for directing application host data onto one of the paths through the network to one of the storage controllers,
   wherein the at least one controller monitor monitors the plurality of storage controllers in the storage subsystem and sends an operational status message to the path processor when it determines the operational status of a storage controller has changed,
   wherein on receipt of the operational status message the path processor redirects application host data through the network to or from the storage controller,
   wherein each storage controller has a corresponding controller monitor for monitoring operational information of the storage controller, and
   wherein each controller monitor monitors the operational information of a corresponding storage controller by directly reading the corresponding storage controller and also monitors the operational information of a partner storage controller of the corresponding storage controller by directly reading the partner storage controller, such that if one controller monitor does not send an operational status message for the corresponding storage controller of the one controller monitor, then the partner controller monitor of the one controller monitor does.

11. The system of claim 10, wherein the controller monitor determines whether the change in status is a failure, potential failure, or reconnection and sends this determination in the operational status message.

12. The system of claim 10, wherein the controller monitor sends an operational status message whenever the operational status changes.

13. The system of claim 10, wherein each storage controller maintains operational status information and the at least one controller monitor monitors the operational status information for changes.

14. The system of claim 10, wherein the operational status indicates an immediate failure of a storage controller and after receipt of the operational status message the path controller immediately redirects application host data onto another path controller unaffected by the failed storage controller.

15. The system of claim 10, wherein the operational status indicates an imminent failure of a storage controller and after receipt of the operational status message the path controller prepares to redirect application host data onto another path controller unaffected by the failed storage controller.

16. The system of claim 10, wherein the operational status indicates a reconnection of a storage controller and after receipt of the operational status message the path controller redirects application host data back to the reconnected path controller.

17. The system of claim 10, wherein the operational status indicates an overload status of a storage controller and after receipt of the operational status message the path controller redirects some of the application host data onto another path controller unaffected by overload.

18. A computer-readable medium having one or more computer programs stored thereon to perform a method for determining a data path in storage network, the network having a path processor for directing data onto one of two or more paths between an application host and two or more storage controllers in a storage subsystem, the method comprising:
monitoring the operational status of a storage controller in the storage subsystem;
determining whether a change in the operational status of the storage controller is a failure or a potential failure; and,
sending the determination to the path processor,
wherein the path processor redirects application host data from a path controller on the basis of the determination,
wherein the storage controller is a first storage controller of the two or more storage controllers and the two or more storage controllers further comprise a second storage controller,
wherein the method further comprises:
monitoring the operational status of the first storage controller by the second controller monitor directly reading the first storage controller;
monitoring the operational status of the second storage controller by the first controller monitor directly reading the second storage controller;
monitoring the operational status of the second storage controller b the second controller monitor directly reading the second storage controller,
wherein if the first controller monitor does not send an operational status message regarding the first storage controller, then the second controller monitor sends the operational status message regarding the first storage controller.

19. The medium of claim 18, wherein determining whether the change in the operational status of the storage controller is a failure or a potential failure further determines whether a change in the operational status of the storage controller is a reconnection.

20. The medium of claim 18, wherein determining whether the change in the operational status of the storage controller is a failure or a potential failure further determines whether a change in the operational status of the storage controller is an overloading of the storage controller.

21. The medium of claim 18, wherein monitoring the operational status of the storage controller monitors the operational status of two storage controllers in the storage subsystem.

22. The medium of claim 18, the method further comprising maintaining operational status information, wherein monitoring the operational status of the storage controller monitors the operational status information for changes.

23. The medium of claim 18, wherein the operational status indicates an immediate failure of a storage controller and after receipt of the operational status message the path processor immediately redirects application host data onto another path controller unaffected by the failed storage controller.

24. The medium of claim 18, wherein the operational status indicates a potential failure of a storage controller and after receipt of the operational status message the path controller prepares to redirect application host data onto another path controller unaffected by the failed storage controller.

25. The medium of claim 18, wherein the operational status indicates a reconnection of a storage controller and after receipt of the operational status message the path controller redirects application host data back to the reconnected path controller.

26. The medium of claim 18, wherein the operational status indicates an overload status of a storage controller and after receipt of the operational status message the path controller redirects some of the application host data onto another path controller unaffected by overload.

27. A storage area network system comprising:
a storage subsystem comprising two or more storage controllers;
a storage area network comprising two or more paths between an application host and the two or more storage controllers in a storage subsystem;
a path processor for directing application host data onto one of the paths through the network to one of the storage controllers; and,
means for monitoring the two or more storage controllers in the storage subsystem and for sending an operational status message to the path processor when determining the operational status of a storage controller has changed,
wherein on receipt of the operational status message the path processor redirects application host data through the network to or from the storage controller,
wherein the means comprises a plurality of controller monitors,
wherein each controller monitor monitors the operational information of a corresponding storage controller by directly reading the corresponding storage controller and also monitors the operational information of a partner storage controller of the corresponding storage controller by directly reading the partner storage controller, such that if one controller monitor does not send an operational status message for the corresponding storage controller of the one controller monitor, then the partner controller monitor of the one controller monitor does.

28. The system of claim 27, wherein the operational status indicates one of:

an immediate failure of a storage controller and after receipt of the operational status message the path controller immediately redirects application host data onto another path controller unaffected by the failed storage controller; and, an imminent failure of a storage controller and after receipt of the operational status message the path controller prepares to redirect application host data onto another path controller unaffected by the failed storage controller.

29. The system of claim 27, wherein the operational status indicates a reconnection of a storage controller and after receipt of the operational status message the path controller redirects application host data back to the reconnected path controller.

30. The system of claim 27, wherein the operational status indicates an overload status of a storage controller and after receipt of the operational status message the path controller redirects some of the application host data onto another path controller unaffected by overload.

\* \* \* \* \*